US012592383B2

(12) United States Patent　(10) Patent No.:　US 12,592,383 B2
Han et al.　(45) Date of Patent:　Mar. 31, 2026

(54) METHOD OF MANUFACTURING CATHODE ACTIVE MATERIAL FOR LITHIUM SECONDARY BATTERY

(71) Applicant: SK ON CO., LTD., Seoul (KR)

(72) Inventors: Kook Hyun Han, Daejeon (KR); Ji Hoon Choi, Daejeon (KR); Jik Soo Kim, Daejeon (KR); Kwang Ho Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 805 days.

(21) Appl. No.: 17/691,423

(22) Filed: Mar. 10, 2022

(65) Prior Publication Data

US 2022/0293935 A1　Sep. 15, 2022

(30) Foreign Application Priority Data

Mar. 11, 2021　(KR) ........................ 10-2021-0031890

(51) Int. Cl.
　*H01M 4/525*　(2010.01)
　*H01M 4/02*　(2006.01)
　　　　(Continued)
(52) U.S. Cl.
　CPC ........... *H01M 4/525* (2013.01); *H01M 4/043* (2013.01); *H01M 4/0471* (2013.01);
　　　　(Continued)
(58) Field of Classification Search
　None
　See application file for complete search history.

(56) References Cited

U.S. PATENT DOCUMENTS

| | | | |
|---|---|---|---|
| 2007/0111098 A1 | 5/2007 | Yang Kook et al. | |
| 2019/0051900 A1* | 2/2019 | Yamaguchi | ......... H01M 10/052 |
| 2020/0373573 A1* | 11/2020 | Kim | ...................... H01M 4/485 |

FOREIGN PATENT DOCUMENTS

| | | |
|---|---|---|
| CN | 106602055 A | 4/2017 |
| CN | 111356654 A | 6/2020 |

(Continued)

OTHER PUBLICATIONS

CAS Registry No. 80481-35-2. CAS, 2025. Accessed electronically at www.scifinder-n.org on Jun. 5, 2025. (Year: 2025).*

(Continued)

*Primary Examiner* — Anthony J Zimmer
*Assistant Examiner* — Zachary John Baum
(74) *Attorney, Agent, or Firm* — The Webb Law Firm

(57)　ABSTRACT

Provided is a method of manufacturing a cathode active material for a lithium secondary battery. The method of manufacturing a cathode active material for a lithium secondary battery includes mixing a transition metal macro precursor and a lithium precursor to prepare a preliminary lithium-transition metal composite oxide particle; calcining the prepared preliminary lithium-transition metal composite oxide particle; and pulverizing the calcined preliminary lithium-transition metal composite oxide particle to form lithium-transition metal composite oxide particle. Accordingly, the process may be easily performed and a single crystal cathode active material having a uniform size may be manufactured.

13 Claims, 8 Drawing Sheets

(51) Int. Cl.
    H01M 4/04         (2006.01)
    H01M 4/505        (2010.01)
    H01M 10/0525      (2010.01)
(52) U.S. Cl.
    CPC ....... H01M 4/505 (2013.01); H01M 10/0525
                (2013.01); H01M 2004/021 (2013.01)

(56)                References Cited

FOREIGN PATENT DOCUMENTS

| | | | |
|---|---|---|---|
| CN | 112004779 | A | 11/2020 |
| CN | 112301428 | A | 2/2021 |
| EP | 2744022 | A1 † | 6/2014 |
| KR | 100544541 | B1 | 1/2006 |
| KR | 100548988 | B1 | 2/2006 |
| KR | 1020140076476 | A | 6/2014 |
| KR | 1020200138795 | A | 12/2020 |
| KR | 1020220127517 | A | 9/2022 |
| WO | WO-2015189737 | A1 * | 12/2015 | ............ C01G 53/82 |
| WO | 2019186349 | A1 † | 10/2019 |
| WO | 2020055198 | A1 | 3/2020 |

OTHER PUBLICATIONS

Hu et al., "The Effect of Precursors on Performance of LiNi0.5Co0.2Mn0.3O2 Cathode Material", Journal of Electrochemistry, 2013, p. 3, vol. 19, No. 3.

\* cited by examiner
† cited by third party

[FIG. 1]
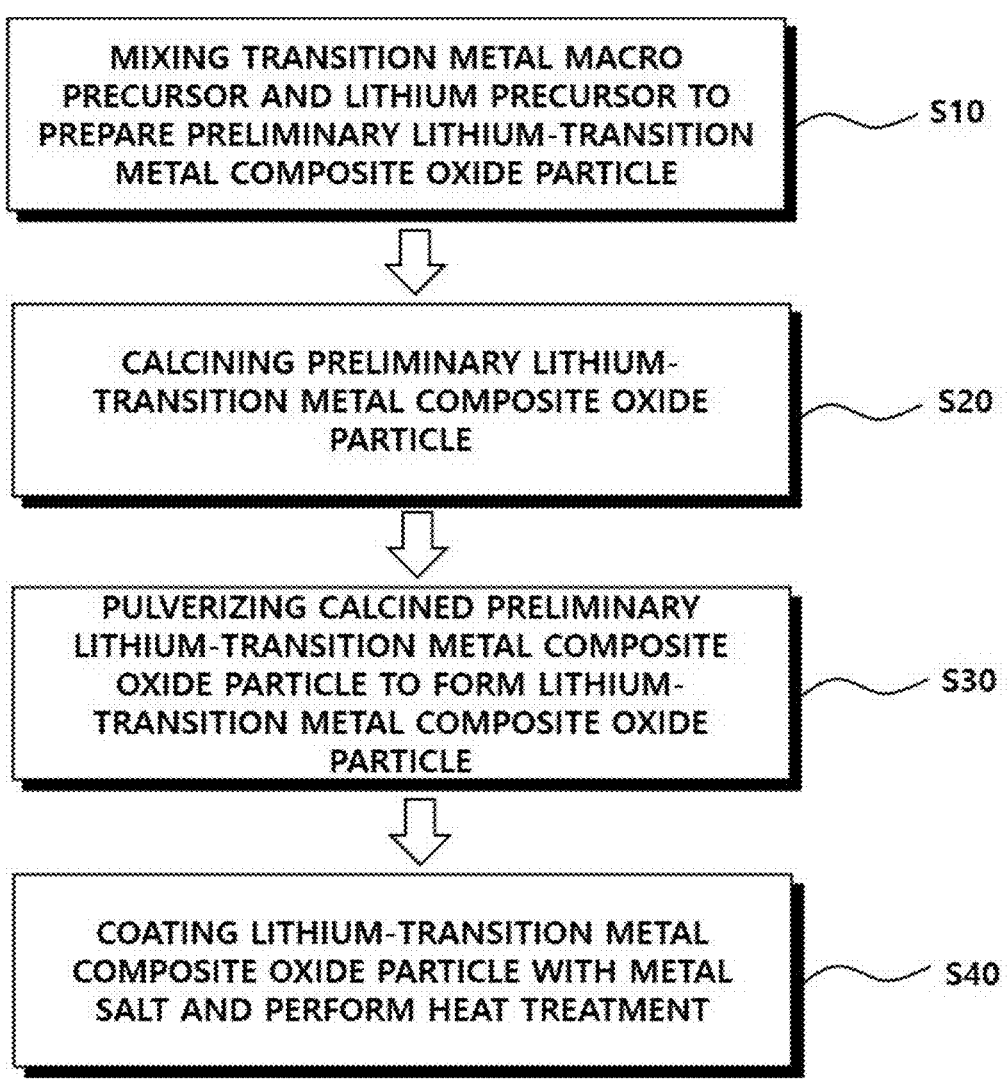

[FIG. 2]
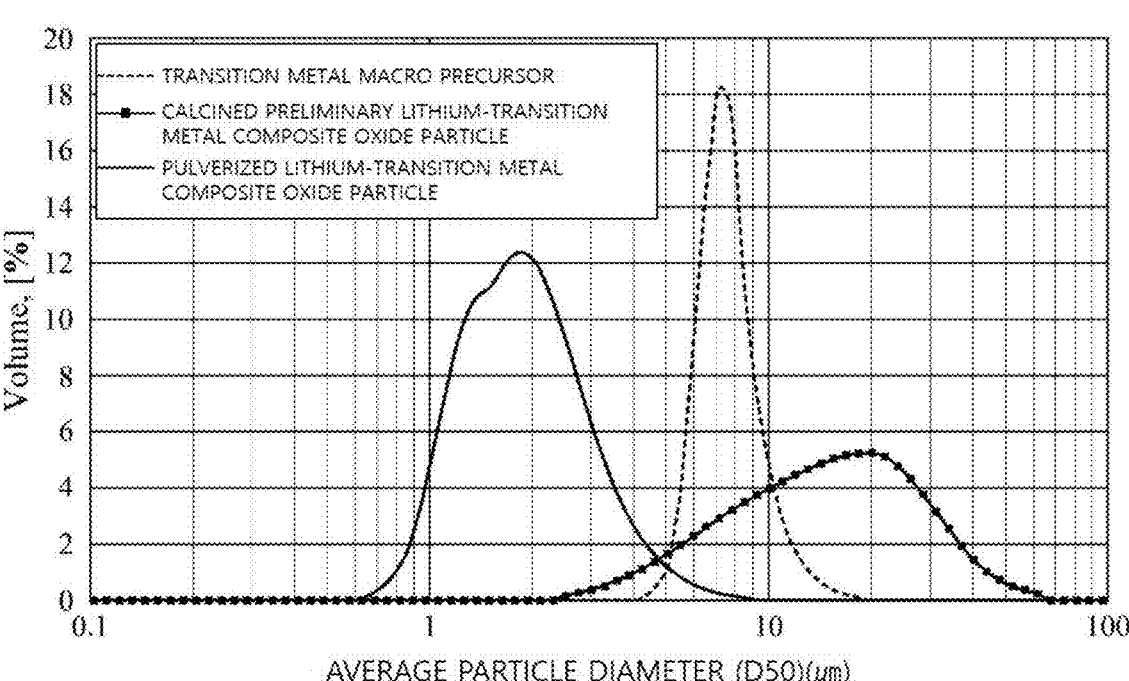

[FIG. 3(a)]
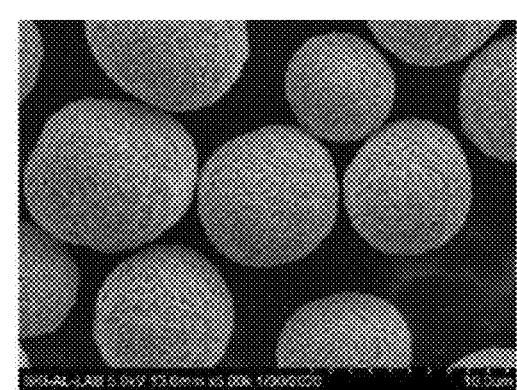
TRANSITION METAL MACRO PRECURSOR
[FIG. 3(b)]
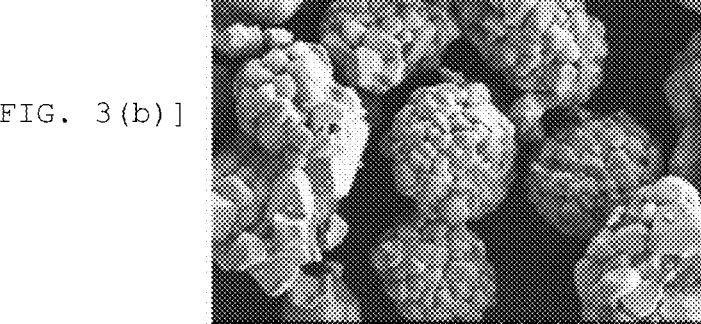
CALCINED PRELIMINARY LITHIUM-TRANSITION
METAL COMPOSITE OXIDE PARTICLE
[FIG. 3(c)]
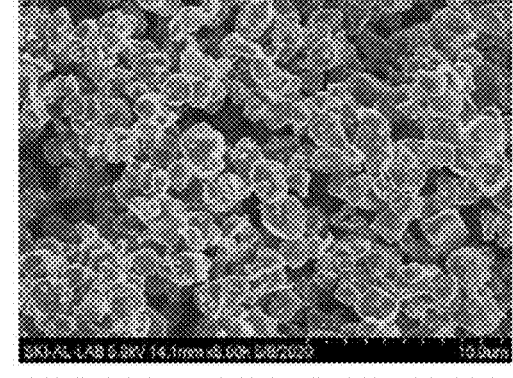
PULVERIZED LITHIUM-TRANSITION METAL
COMPOSITE OXIDE PARTICLE

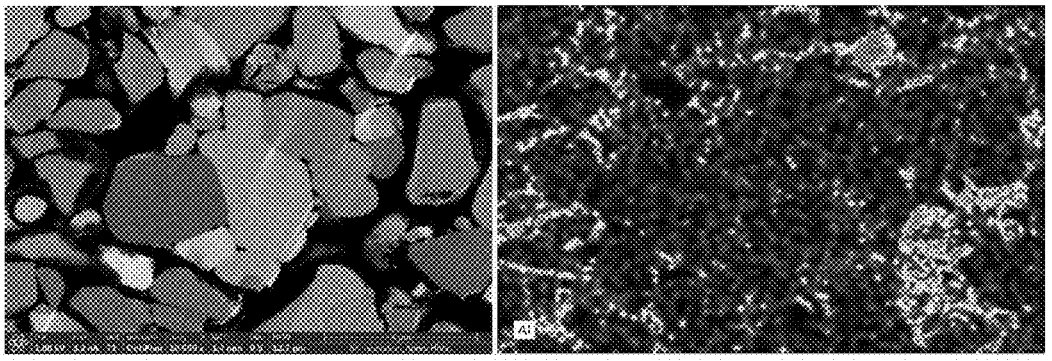
[FIG. 4(a)]
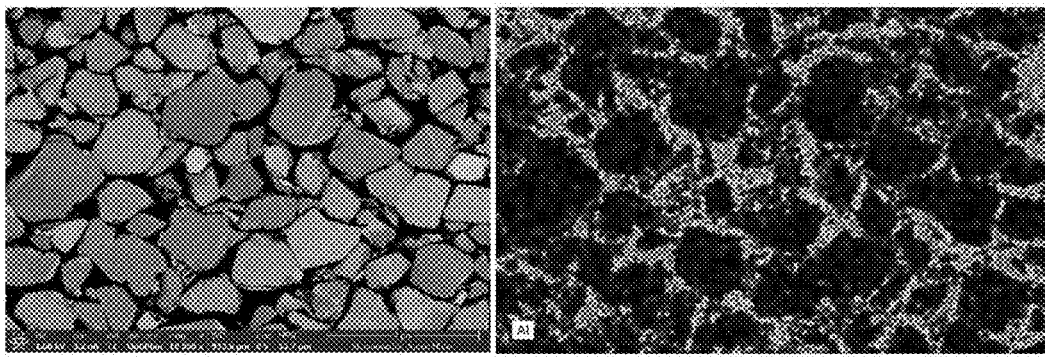
[FIG. 4(b)]

[FIG. 5]
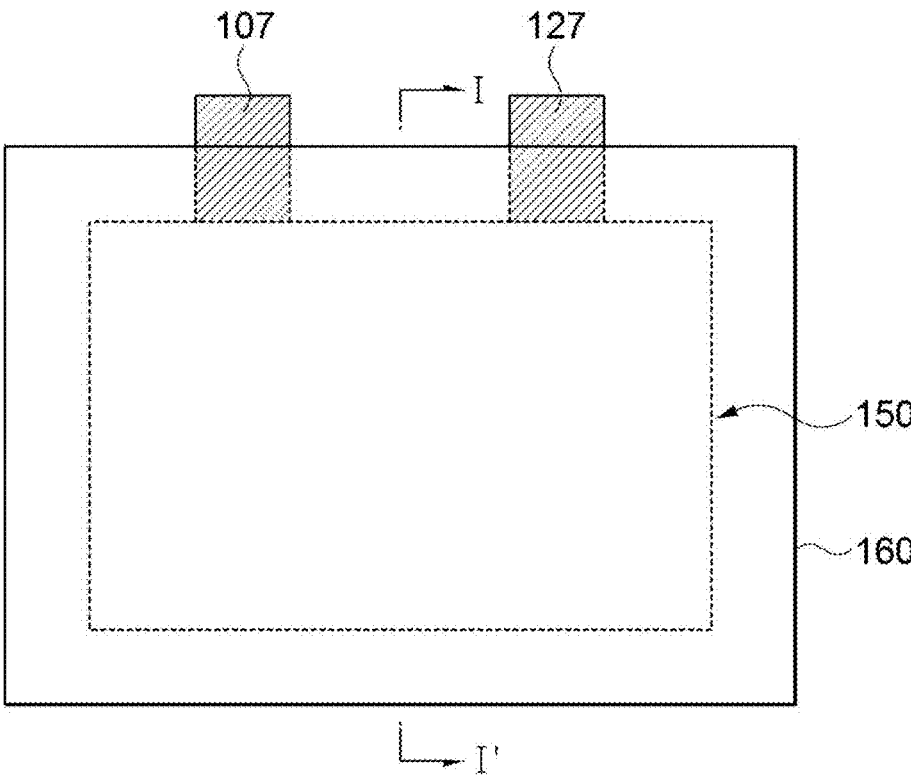
[FIG. 6]
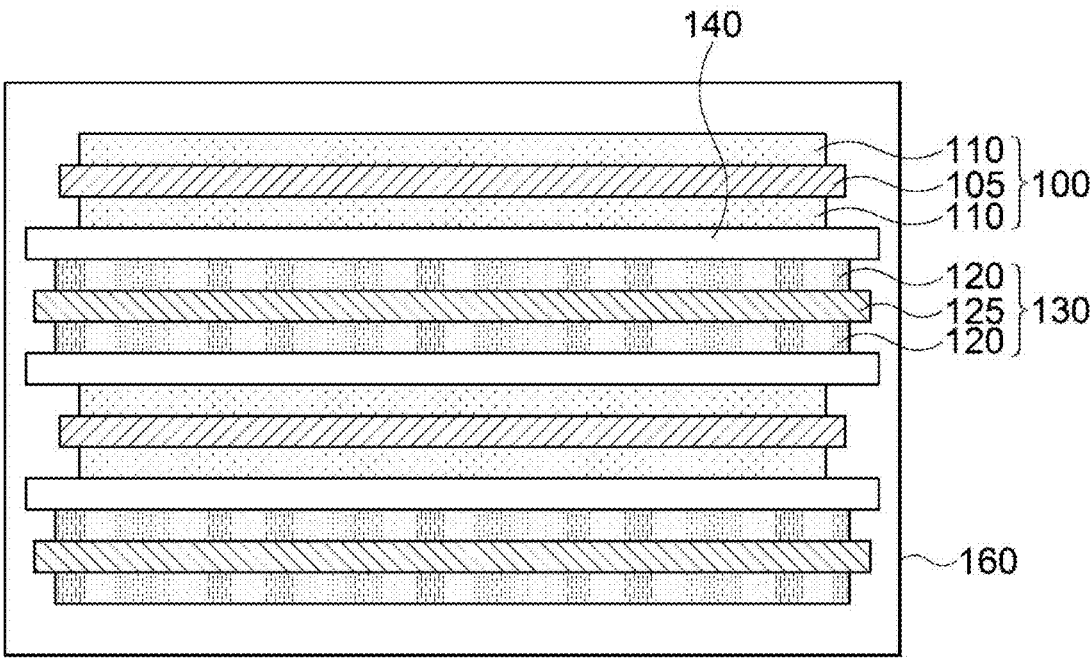

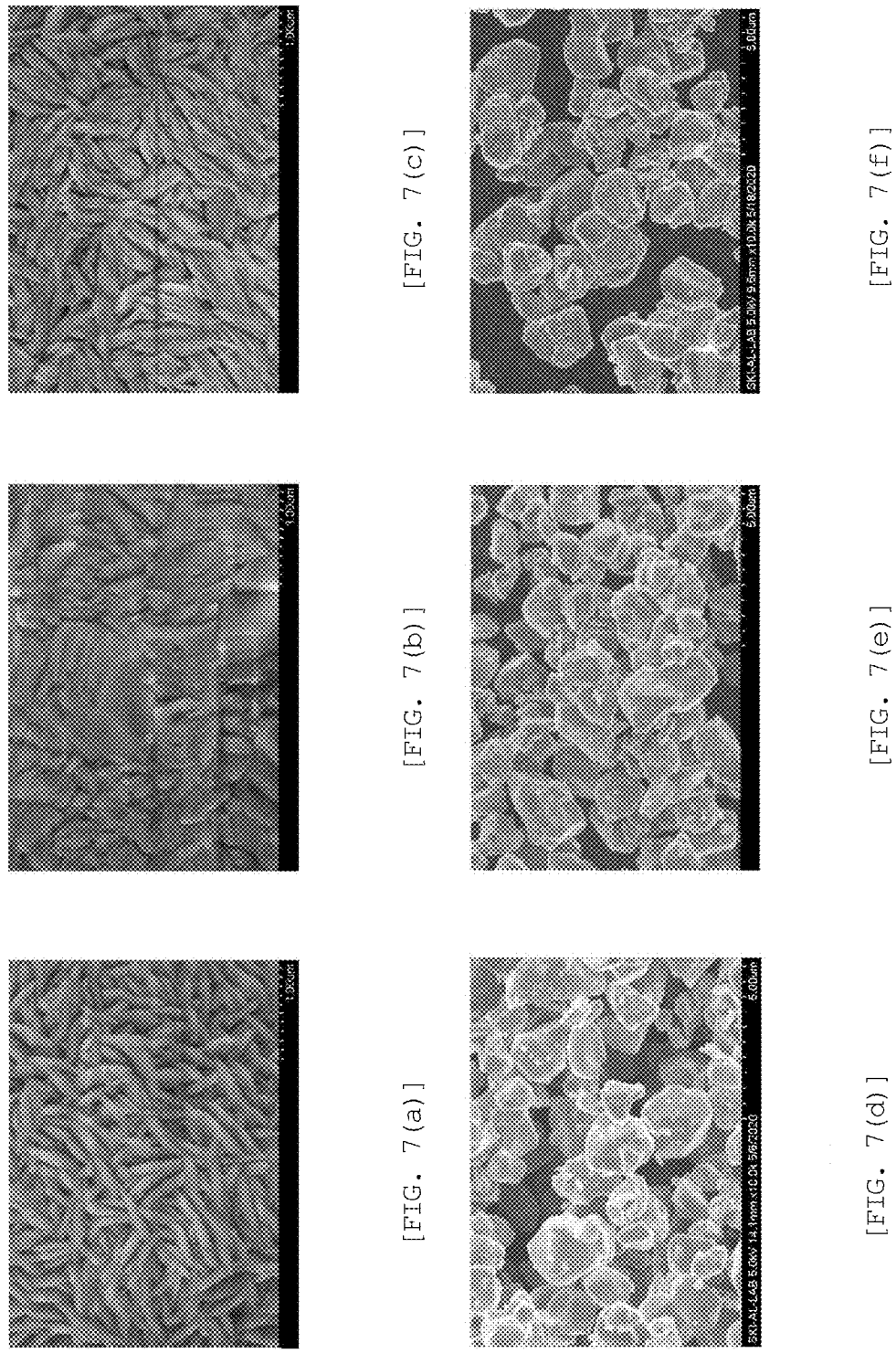
[FIG. 7(a)]
[FIG. 7(b)]
[FIG. 7(c)]
[FIG. 7(d)]
[FIG. 7(e)]
[FIG. 7(f)]

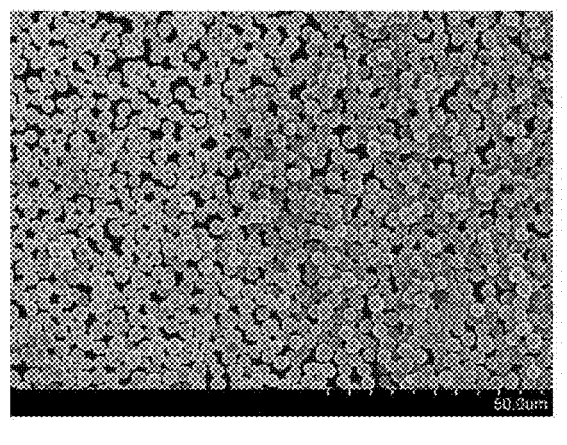
[FIG. 8(a)]
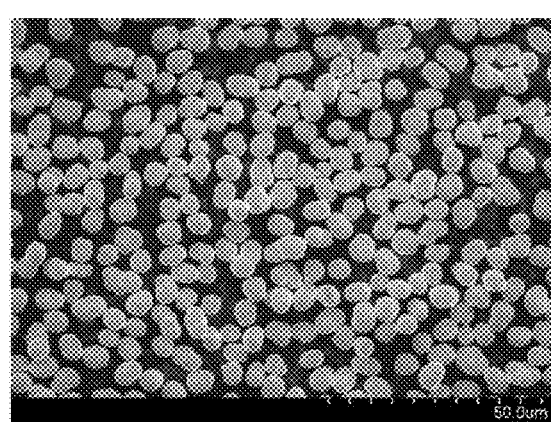
[FIG. 8(b)]
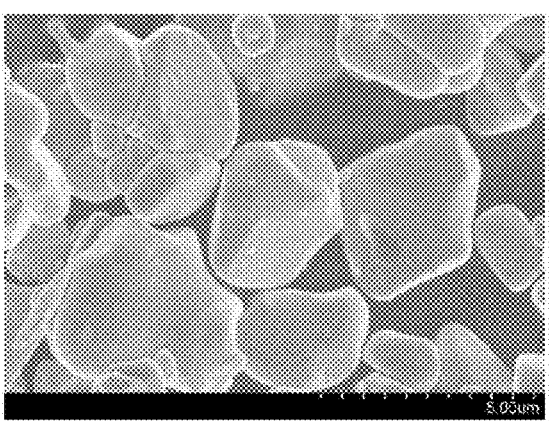
[FIG. 8(c)]
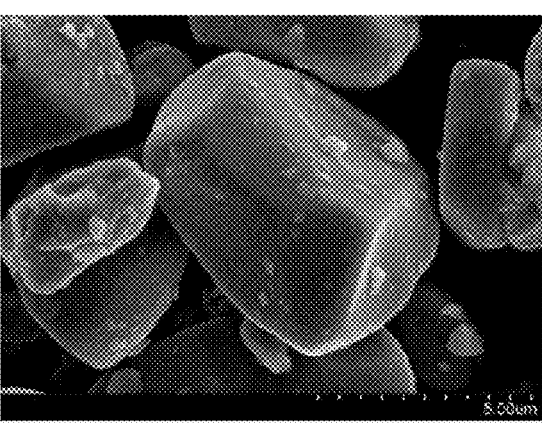
[FIG. 8(d)]

[FIG. 9]
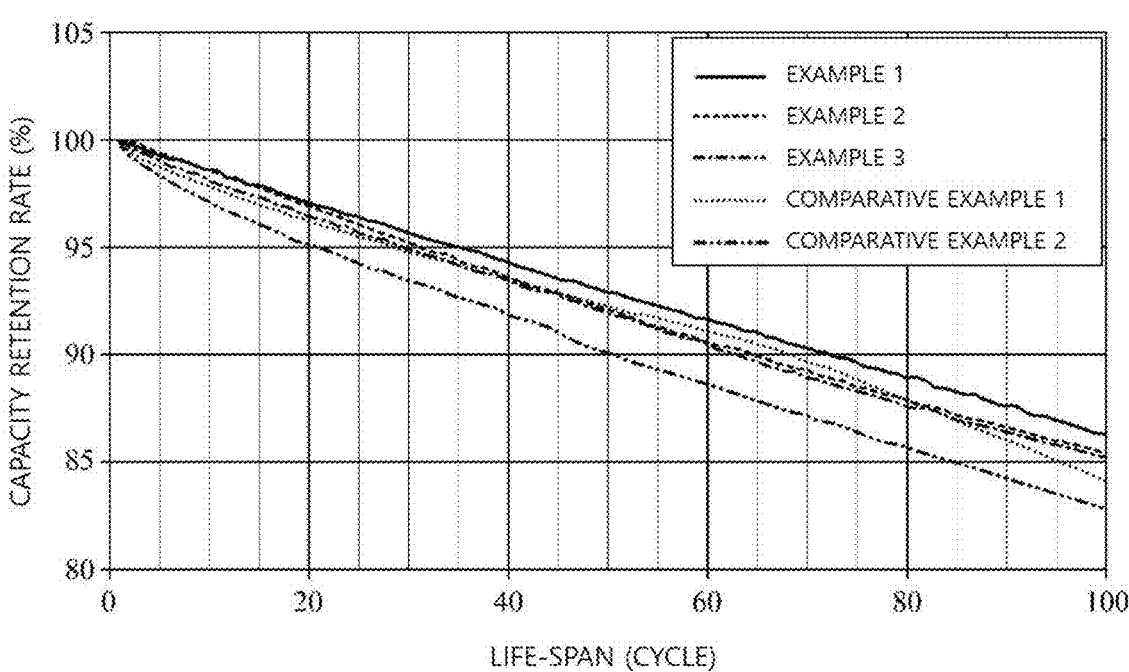

METHOD OF MANUFACTURING CATHODE ACTIVE MATERIAL FOR LITHIUM SECONDARY BATTERY

CROSS-REFERENCE TO RELATED APPLICATION

This application claims priority to Korean Patent Application No. 10-2021-0031890 filed Mar. 11, 2021, the disclosure of which is hereby incorporated by reference in its entirety.

BACKGROUND OF THE INVENTION

1. Field of the Invention

The present invention relates to a cathode active material for a lithium secondary battery and a method of manufacturing the same, and more particularly, to a lithium metal oxide-based cathode active material for a lithium secondary battery and a method of manufacturing the same.

2. Description of the Related Art

A secondary battery is a battery which can be repeatedly charged and discharged. With rapid progress of information and communication, and display industries, the secondary battery has been widely applied to various portable telecommunication electronic devices such as a camcorder, a mobile phone, a laptop computer as a power source thereof. Recently, a battery pack including the secondary battery has also been developed and applied to an eco-friendly automobile such as a hybrid vehicle as a power source thereof.

Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight. In this regard, the lithium secondary battery has been actively developed and applied as a power source.

A lithium metal oxide may be used as a cathode active material for the lithium secondary battery. For example, the cathode active material may have a form of particles having a single crystal or polycrystalline structure.

For example, cathode active material particles having the single crystal structure are excellent in terms of energy density per volume and structural stability, but may cause an increase in process difficulty and an increase in a ratio of the polycrystalline particles in a process of preparing minute-sized single crystal particles. Thereby, process efficiency may be decreased, and life-span properties and operational reliability of the secondary battery may be reduced.

For example, Korean Patent Registration No. 10-0548988 discloses a method of manufacturing a cathode active material for a lithium secondary battery, but there is a limitation in securing sufficient life-span properties and stability.

PRIOR ART DOCUMENT

Patent Document

Korean Patent Registration No. 10-0548988

SUMMARY OF THE INVENTION

An object of the present invention is to provide a method of manufacturing a cathode active material for a lithium secondary battery having excellent operational stability and reliability.

Another object of the present invention is to provide a lithium secondary battery including a cathode active material having excellent operational stability and reliability.

To achieve the above objects, according to an aspect of the present invention, there is provided a method of manufacturing a cathode active material for a secondary battery, the method including: mixing a transition metal macro precursor and a lithium precursor to prepare a preliminary lithium-transition metal composite oxide particle; calcining the preliminary lithium-transition metal composite oxide particle; and pulverizing the calcined preliminary lithium-transition metal composite oxide particle to form lithium-transition metal composite oxide particle having an average particle diameter (D50) smaller than an average particle diameter of the transition metal macro precursor.

In some embodiments, the average particle diameter of the transition metal macro precursor may be 7 $\mu$m or more.

In some embodiments, the calcined preliminary transition metal composite oxide particle may include a form of secondary particle which is an aggregate of primary particles.

In some embodiments, the pulverizing may be a step of separating the secondary particle into the primary particles.

In some embodiments, the lithium-transition metal composite oxide particle may include a form of single particle.

In some embodiments, the form of single particle may include a form of single body formed by attaching or coming into close contact with each other of 2 to 10 single particles.

In some embodiments, the lithium-transition metal composite oxide particle may have an average particle diameter of 1 to 3 $\mu$m.

In some embodiments, the transition metal macro precursor may have a BET specific surface area of 3 to 11 m$^2$/g.

In some embodiments, the lithium-transition metal composite oxide particle may be represented by Formula 1 below:

$$Li_aNi_xM_{1-x}O_{2+y} \qquad \text{[Formula 1]}$$

(In Formula 1, a is in a range of $0.9 \leq a \leq 1.2$, x is 0.6 or more ($x \geq 0.6$), and y is in a range of $-0.1 \leq y \leq 0.1$, and M denotes at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn, Ba, Sr or Zr).

In some embodiments, a calcination temperature at the step of calcining the preliminary lithium-transition metal composite oxide particle may be represented by Equations 1 and 2 below:

$$T2-30 \leq T1(^\circ C.) \leq T2+30 \qquad \text{[Equation 1]}$$

(In Equation 1, T2 is a temperature according to Equation 2 below, and T1 is the calcination temperature)

$$T2(^\circ C.)=-520*x+1330 \qquad \text{[Equation 2]}$$

(In Equation 2, x is the x defined in Formula 1 above).

In some embodiments, the pulverizing may include the step of accelerating and pulverizing the calcined lithium-transition metal composite oxide particle using compressed air.

In some embodiments, the step of forming of the lithium-transition metal composite oxide particle may further include the step of pulverizing the calcined preliminary lithium-transition metal composite oxide particle, then coating a surface with a metal salt and performing heat treatment.

In some embodiments, the transition metal macro precursor may include a compound containing nickel, cobalt and manganese.

In some embodiments, the lithium precursor may include at least one of lithium carbonate, lithium nitrate, lithium acetate, lithium oxide and lithium hydroxide.

In some embodiments, the calcined preliminary lithium-transition metal composite oxide particle may form an aggregate of the preliminary lithium-transition metal composite oxide particle, and the method may exclude the step of crushing the aggregate of the preliminary lithium-transition metal composite oxide particle.

According to another aspect of the present invention, there is provided a lithium secondary battery including: a cathode comprising a cathode active material layer comprising the above-described lithium-transition metal composite oxide particle; an anode; and a separation membrane disposed between the cathode and the anode.

The method of manufacturing a cathode active material for a lithium secondary battery according to the above-described exemplary embodiments may include the step of pulverizing the calcined preliminary lithium-transition metal composite oxide particle. In this case, a lithium-transition metal composite oxide particle having an average particle diameter smaller than that of a transition metal macro precursor and including a form of primary particle having a single crystal structure may be formed. Accordingly, process difficulty may be reduced and life-span properties of the secondary battery may be improved.

In some embodiments, the transition metal macro precursor may have an average particle diameter of 7 μm or more. In this case, the volume per weight of the preliminary lithium-transition metal composite oxide particle may be reduced, thus to increase a weight (e.g., a loading amount) that can be input to the calcined structure once in the calcination process. Accordingly, process efficiency may be enhanced and manufacturing costs of the cathode active material may be reduced.

In some embodiments, the average particle diameter of the target lithium-transition metal composite oxide particle may be controlled by adjusting the calcination temperature in the step of calcining the preliminary lithium-transition metal composite oxide particles. Accordingly, it is possible to easily control the average particle diameter of the lithium-transition metal composite oxide particles depending on the purpose of use and application.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a flowchart for describing processes in a method of manufacturing a cathode active material according to exemplary embodiments;

FIG. 2 is a graph schematically illustrating a change in the particle size distribution of cathode active material particles according to exemplary embodiments;

FIGS. 3(a)-(c) are enlarged views of the particles in accordance with the steps in the method of manufacturing a cathode active material according to exemplary embodiments;

FIGS. 4(a)-(b) are cross-sectional scanning electron microscope (SEM) photographs of lithium-transition metal composite oxide particles coated with metal salts prepared according to the examples and comparative examples;

FIGS. 5 and 6 are a schematic plan view and a cross-sectional view illustrating a lithium secondary battery according to exemplary embodiments, respectively;

FIGS. 7(a)-(f) are surface SEM photographs of the cathode active materials prepared according to the examples;

FIGS. 8(a)-(d) are surface SEM photographs of the cathode active materials prepared according to the comparative examples; and FIG. 9 is a graph illustrating evaluation results of capacity retention rates of secondary batteries according to the examples and comparative examples.

DESCRIPTION OF THE INVENTION

Embodiments of the present invention provide a method of manufacturing a cathode active material including a pulverizing process, and a lithium secondary battery including the manufactured cathode active material.

Hereinafter, exemplary embodiments of the present invention will be described in detail with reference to the accompanying drawings. However, these embodiments are merely an example, and the present invention is not limited to the specific embodiments described as the example.

FIG. 1 is a flowchart for describing processes in a method of manufacturing a cathode active material according to exemplary embodiments.

Hereinafter, the method of manufacturing a cathode active material for a lithium secondary battery according to exemplary embodiments will be described with reference to FIG. 1.

Referring to FIG. 1, a preliminary lithium-transition metal composite oxide particle may be prepared by mixing a transition metal macro precursor and a lithium precursor (e.g., step S10).

The transition metal macro precursor may include a nickel, cobalt and manganese-containing compound. The transition metal macro precursor may include, for example, nickel, cobalt and manganese-containing hydroxide, sulfate, acetate, nitrate, carbonate, and a hydrate thereof, etc.

The transition metal macro precursor may be prepared through a co-precipitation reaction of metal salts. The metal salts may include nickel salts, manganese salts and cobalt salts.

Examples of the nickel salt may include nickel sulfate, nickel hydroxide, nickel nitrate, nickel acetate, and a hydrate thereof, etc. Examples of the manganese salt may include manganese sulfate, manganese acetate, and a hydrate thereof, etc. Examples of the cobalt salt may include cobalt sulfate, cobalt nitrate, cobalt carbonate, and a hydrate thereof, etc.

The metal salts may be mixed together with a precipitant and/or a chelating agent while controlling the content or concentration ratio of each metal to prepare an aqueous solution. The aqueous solution may be co-precipitated in a reactor to prepare the transition metal macro precursor.

The precipitant may include an alkaline compound such as sodium hydroxide (NaOH), sodium carbonate ($Na_2CO_3$) and the like. The chelating agent may include, for example, ammonia water (e.g., $NH_4OH$), ammonium carbonate (e.g., $NH_3HCO_3$) and the like.

The temperature of the co-precipitation reaction may be controlled, for example, in a range of about 40° C. to 60° C. The reaction time may be controlled in a range of about 24 to 72 hours.

For example, the transition metal precursor may have an average particle diameter (D50) of 3 μm or less. In this case, since the size of the transition metal precursor is small, a yield may be decreased when reacting with the lithium precursor, and a specific surface area of the transition metal precursor may be increased, thereby causing the use of a large amount of water when washing the precursor to remove Na and S existing on the surface after synthesis thereof.

In addition, in the process of manufacturing the lithium-transition metal composite oxide through primary calcination, if the average particle diameter of the transition metal precursor is small (e.g., 3 μm or less), a ratio of weight per unit volume may be decreased. In this case, since a weight of the mixture that can be put in a sagger at once when mixing and calcining the lithium precursor is reduced, a weight that can be calcined once in the calcination step may be reduced, which will be described below.

In addition, after calcination, the strength of a cake of the lithium-transition metal composite oxide particle is increased, which will be described below, such that pulverizing and pulverizing of the particles may not be sufficiently performed, thereby causing a reduction in process efficiency and an increase in process difficulty. In this case, the lithium-transition metal composite oxide particle may not exist as a single particle, but may exist in a form in which several single particles are aggregated. In addition, a crack of the particle may be increased during pulverizing the cake having a high strength. Thereby, life-span properties of the cathode active material may be reduced.

In exemplary embodiments of the present invention, the above-described transition metal macro precursor may have an average particle diameter of 7 μm or more. In this case, since the size of the transition metal macro precursor is relatively large, residual impurities (e.g., Na, S, etc.) may be relatively easily washed after synthesis of the precursor, thereby reducing the amount of water used to wash the precursor.

For example, within the above range, the weight per unit volume of the lithium-transition metal composite oxide may be relatively increased, thereby a weight thereof that can be calcined once may be increased in the calcination step to be described below. In this case, the weight of the mixture that can be put in a calcination vessel at a time is increased, such that the process yield may be improved. In addition, for example, the cake has a low strength after calcination, such that pulverizing and pulverizing may be relatively easily performed. Accordingly, the phenomenon, in which the particles are cracked, may be decreased, process efficiency may be increased, and process difficulty may be reduced.

If the average particle diameter of the transition metal macro precursor is 7 μm or more, the above effect may be exhibited, and therefore an upper limit thereof is not particularly limited, but may be 13 μm as an example.

For example, the average particle diameter of the transition metal macro precursor may be controlled and adjusted by changing the temperature and reaction time of the co-precipitation reaction described above.

In some embodiments, a transition metal macro precursor having a relatively low density may be synthesized by controlling the temperature and reaction time during the co-precipitation reaction for generating the transition metal macro precursor. In this case, severe conditions are not required during the pulverizing process to be described below, and pulverizing may be relatively easily performed.

In some embodiments, the transition metal macro precursor may have a BET specific surface area of 3 to 11 m²/g. In this case, a change in the discharge capacity depending on the BET specific surface area may be minimized. Accordingly, a secondary battery having stable capacity properties may be implemented.

As used herein, the term "average particle size" or "D50" may refer to a particle size when a volume accumulation percentage in the particle size distribution obtained from the particle volume corresponds to 50%.

The lithium precursor compound may include, for example, lithium carbonate, lithium nitrate, lithium acetate, lithium oxide, lithium hydroxide, etc. as a lithium salt. These may be used alone or in combination of two or more thereof.

In exemplary embodiments, the obtained preliminary lithium-transition metal composite oxide particles may be calcined (e.g., step S20).

For example, the calcination may be performed in a calcined structure (e.g., a metal oxide sagger). For example, the metal oxide sagger may be an alumina sagger.

As described above, the transition metal macro precursor may have an average particle diameter of 7 μm or more. In this case, the weight per volume of the preliminary lithium-transition metal composite oxide particle may be increased, such that the weight (e.g., the loading amount) that can be input to the calcined structure once may be increased. Accordingly, process efficiency may be enhanced and manufacturing costs of the cathode active material may be reduced.

In example embodiments, the calcination temperature may be 600 to 1000° C. In this case, the transition metal macro precursor and the lithium precursor which form the preliminary lithium-transition metal composite oxide particles are strongly bonded to each other through high temperature calcination, such that structural stability may be improved.

For example, secondary particles, which are aggregates of the lithium-transition metal composite oxide primary particles, may be formed in the above-described calcination step. For example, the calcined preliminary transition metal composite oxide particles may include secondary particles which are aggregates of the primary particles.

The calcination temperature of the step of calcining the preliminary lithium-transition metal composite oxide particle may be expressed by Equations 1 and 2 below.

$$T2-30 \leq T1(^\circ C.) \leq T2+30 \qquad \text{[Equation 1]}$$

In Equation 1, T2 may be a temperature according to Equation 2 below, and T1 may be the calcination temperature.

$$T2(^\circ C.)=-520*x+1330 \qquad \text{[Equation 2]}$$

In Equation 2, x may be the x defined in Formula 1 to be described below.

In this case, for example, the preliminary lithium-transition metal composite oxide particle may be easily formed in the form of secondary particle in which the primary particles are gathered.

In some embodiments, the calcined preliminary lithium-transition metal composite oxide may form an aggregate of the preliminary lithium-transition metal composite oxide particle. For example, the aggregate of the preliminary lithium-transition metal composite oxide particle may have a cake shape.

In some embodiments, the inventive method may exclude the step of crushing the aggregate of the preliminary lithium-transition metal composite oxide particle.

For example, when the average particle diameter of the transition metal macro precursor particles is 7 μm or more, the aggregate of the preliminary lithium-transition metal composite oxide particles may not be densified and the strength of the cake may be reduced. Accordingly, the aggregate of the preliminary lithium-transition metal composite oxide particle may be easily separated in the form of secondary particle without a separate coarse grinding (e.g., pulverizing the particle into a size of 0.1 to 0.5 mm) process.

For example, when the average particle diameter of the transition metal macro precursor is relatively small (e.g., less than 7 μm), the average particle diameter of the prepared preliminary lithium-transition metal composite oxide particle is relatively small, such that the pulverizing process with a jet mill may not be performed. In this case, a ratio of the lithium-transition metal composite oxide particle in the form of secondary particle may be increased. Accordingly, coating with metal salts, which will be described below, may not be uniformly performed, and the mechanical stability of the cathode active material may be reduced, such that the capacity properties and life-span properties of the lithium secondary battery may be decreased.

In exemplary embodiments, the calcined preliminary lithium-transition metal composite oxide particle may be pulverized to form lithium-transition metal composite oxide particle having an average particle diameter smaller than the average particle diameter of the transition metal macro precursor (e.g., step S30).

In some embodiments, the pulverizing may include the step of accelerating and pulverizing the calcined preliminary lithium-transition metal composite oxide particle using compressed air.

For example, the preliminary lithium-transition metal composite oxide particle on which the calcination is completed may be pulverized through the jet mill. For example, the pulverizing through the jet mill may be performed by pulverizing and pulverizing the preliminary lithium-transition metal composite oxide particle using Fluidized Bed Jet Mill CSG 16 equipment manufactured by NETZSCH, Germany. In this case, the secondary particle may be separated in the form of primary particles.

For example, samples of the preliminary lithium-transition metal composite oxide particle may be transferred by setting an air pressure of the equipment to 5.5 bar, and each transferred sample may be ejected in a center direction of a cylindrical device through three nozzles arranged at an interval of 120 degrees at the same height of the cylindrical device. In this case, the lithium-transition metal composite oxide particle may be ground so as to have an average particle diameter of 3 μm or less by collision between the preliminary lithium-transition metal composite oxide particle ejected at a high speed in the center direction. For example, the lithium-transition metal composite oxide particle pulverized by impact may be collected at an upper portion of the cylindrical device. Thereafter, by rotating a classifier included in the device (e.g., at a speed of 5,000 rpm), the lithium-transition metal composite oxide particles having an average particle diameter of 3 μm or less may be finally recovered.

As used herein, the term "single particle form" is used to, for example, exclude secondary particles formed by aggregating a plurality of primary particles. For example, the lithium-transition metal composite oxide particles are composed of particles in the substantially a form of single particle, and the secondary particle structure in which the primary particles are assembled or aggregated may be excluded.

As used herein, the term "form of single particle" and/or "single particle form" does not exclude that, for example, a plurality (in a range of 2 to 10) of single particles are attached or come into close contact with each other to have a form of single body.

In some embodiments, the lithium-transition metal composite oxide particle may include a structure in which a plurality of primary particles are integrally merged together and are substantially converted into single particle.

For example, the lithium-transition metal composite oxide particles may have a granular or spherical single particle form.

For example, the lithium-transition metal composite oxide particle may be represented by Formula 1 below.

$$Li_aNi_xM_{1-x}O_{2+y} \qquad \text{[Formula 1]}$$

In Formula 1, a may be in a range of $0.9 \le a \le 1.2$, x may be 0.6 or more ($x \ge 0.6$), and y may be in a range of $-0.1 \le y \le 0.1$. M may denote at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn, Ba, Sr or Zr.

In some embodiments, a molar ratio or concentration x of Ni in Formula 1 may be 0.8 or more, and in a preferred embodiment, may exceed 0.8.

Ni may be provided as a transition metal associated with the output and capacity of the lithium secondary battery. Therefore, as described above, by employing the composition of high-nickel (high-Ni) contents in the lithium-transition metal composite oxide particles, it is possible to provide a high-power cathode and a high-power lithium secondary battery.

In this regard, as the content of Ni is increased, long-term storage stability and life-span stability of the cathode or the secondary battery may be relatively reduced. However, according to exemplary embodiments, by including Co, the life-span stability and capacity retention properties may be improved through Mn while maintaining electrical conductivity.

As described above, the calcined preliminary lithium-transition metal composite oxide particle may have the form of secondary particles in which primary particle having a single crystal structure in crystallography are gathered. In this case, the secondary particles may be separated into the primary particles having a single crystal structure through the pulverizing. Thereby, a lithium-transition metal composite oxide particle in the form of primary particle having a single crystal structure may be formed.

The lithium-transition metal composite oxide particle in the form of primary particle having a single crystal structure, for example, have strong resistance to pressure, such that a high-density cathode active material may be formed in a rolling process. In this case, the energy density of the secondary battery is increased, particles having a crack are reduced, and a generation of gas in a high-temperature environment is reduced, such that the output properties, life-span properties, and driving stability of the secondary battery may be improved.

FIG. 2 is a graph schematically illustrating a change in the particle size distribution of cathode active material particles according to exemplary embodiments.

Referring to FIG. 2, the transition metal macro precursor may have a uniform particle size distribution at an average particle diameter (D50) of about 7 μm.

For example, in the above-described preliminary lithium-transition metal composite oxide particles formed after calcination, single particles may exist with being aggregated to form relatively large particle (e.g., secondary particles) having an average particle diameter of 10 μm or more.

For example, in the above-described lithium-transition metal composite oxide particle formed after pulverizing, the secondary particle may be separated into particles (e.g., single particles) having an average particle diameter of 3 μm or less, such that the average particle diameter may be reduced.

In addition, for example, since the secondary particle pulverized to each other in different sizes are separated into the primary particles having relatively uniform sizes, the particle size distribution after pulverizing may be more uniform than before pulverizing.

In exemplary embodiments, the lithium-transition metal composite oxide particle may have an average particle diameter of 1 to 3 μm.

For example, if the average particle diameter of the lithium-transition metal composite oxide particle is too small, the specific surface area may be excessively increased, and if the average particle diameter is too large, the length of a diffusion path of Li ions may be excessively increased. Accordingly, within the above average particle size range, it is possible to prevent a decrease in the capacity and output properties due to an excessive increase in the Li-ion migration pathway while preventing a reduction in the capacity and output properties due to an excessive increase in the specific surface area together.

For example, the average particle diameter of the lithium-transition metal composite oxide particle which is a target product may be controlled by adjusting the calcination temperature in the step of calcining the preliminary lithium-transition metal composite oxide particle. Accordingly, it is possible to easily control the average particle diameter of the lithium-transition metal composite oxide particle depending on the purpose of use and application.

FIGS. 3(a)-(c) are enlarged views of the particles in accordance with the steps in the method of manufacturing a cathode active material according to exemplary embodiments. Specifically, FIG. 3(a) is an enlarged view illustrating the transition metal macro precursor before calcination, FIG. 3(b) is an enlarged view illustrating the calcined preliminary lithium-transition metal composite oxide particle, and FIG. 3(c) is an enlarged view illustrating the pulverized lithium-transition metal composite oxide particle.

Referring to FIGS. 3(a)-(c), a transition metal macro precursor having a relatively large average particle diameter (e.g., 7 μm or more) may be prepared (e.g., FIG. 3(a)). In this case, the preliminary lithium-transition metal composite oxide particle after calcination may be in the form of secondary particle in which primary particles having a relatively small average particle diameter (e.g., 1 to 3 μm) are aggregated (e.g., FIG. 3(b)).

The preliminary lithium-transition metal composite oxide particle in the form of secondary particle may be separated into the primary particles having a single crystal structure with a relatively small average particle diameter (e.g., 1 to 3 μm) through a pulverizing process (e.g., FIG. 3(c)).

In some embodiments, after pulverizing the calcined preliminary lithium-transition metal composite oxide particles, the inventive method may further include coating a surface with a metal salt and performing heat treatment (e.g., step S40).

For example, the metal salt may include a cation selected from $Al^{3+}$, $Zr^{4+}$, $Zn^{2+}$, $Co^{3+}$, $Ti^{4+}$, $Mg^{2+}$, $B^{3+}$, $Ba^{2+}$ and $Sr^{2+}$ and an anion selected from $SO_4^{2-}$, $NO_3^-$, $PO_4^{3-}$, $Cl^-$ and $F^-$. Accordingly, a metal coating layer having excellent mechanical strength may be formed on the surface of the lithium-transition metal composite oxide particle, thereby improving the mechanical stability and life-span properties of the lithium-transition metal composite oxide particle.

For example, the heat treatment may improve a bonding strength between the metal salt coated on the surface and the lithium-transition metal composite oxide particle. Accordingly, the life-span properties and driving stability of the lithium-transition metal composite oxide particle may be improved.

For example, the lithium-transition metal composite oxide particle that surface is coated with the metal salt and subjected to heat treatment allows the possibility of a side reaction with an electrolyte to be reduced. Accordingly, it is possible to suppress a generation of gas inside the secondary battery and improve the life-span properties and thermal stability of the secondary battery.

FIGS. 4(a)-(b) are cross-sectional scanning electron microscope (SEM) photographs of lithium-transition metal composite oxide particle coated with metal salts prepared according to the examples and comparative examples. Specifically, FIG. 4(a) is a cross-sectional photograph of the lithium-transition metal composite oxide particle prepared using a transition metal precursor having an average particle diameter of 3 μm or less, and FIG. 4(b) is a cross-sectional photograph of the lithium-transition metal composite oxide particle prepared using a transition metal macro precursor having an average particle diameter of 7 μm or more.

Referring to FIGS. 4(a)-(b), when using a transition metal precursor having an average particle diameter of 3 μm or less (e.g., FIG. 4(a)), several forms in which a plurality of primary particles are aggregated may exist even after undergoing the pulverizing process.

However, when using a transition metal macro precursor having an average particle diameter of 7 μm or more (e.g., FIG. 4(b)), primary particles having a size of around 3 μm after calcination are weakly aggregated, such that secondary particles having a size of about 7 μm may be formed. Accordingly, most of the secondary particles may be separated into single particles having a size of 3 μm or less through the above-described pulverizing process.

For example, as shown in FIG. 4(a), in the case of the lithium-transition metal composite oxide particle prepared using the transition metal precursor having a size of 3 μm or less, the metal salt coating may be applied only to some surfaces, and the coating may not be applied to the inside of the secondary particle. In this case, the electrolyte may penetrate into the secondary particles according to the use and repeated charging and discharging of the secondary battery, thereby resulting in a generation of gas. Accordingly, the life-span properties of the secondary battery may be reduced.

However, as shown in FIG. 4(b), when using the transition metal macro precursor having an average particle diameter of 7 μm or more, the surface of each single particle may be uniformly coated with the metal salt. In this case, since the uniform metal salt coating exists on the surface of each single particle, it is possible to suppress the generation of gas even upon the penetration of the electrolyte described above. Accordingly, the life-span properties of the secondary battery may be improved.

In some embodiments, a large diameter lithium-transition metal composite oxide particle may be mixed together with the above-described lithium-transition metal composite oxide particles and used as a cathode active material.

For example, the large diameter lithium-transition metal composite oxide particles may have an average particle diameter of 10 to 15 μm.

For example, the large diameter lithium-transition metal composite oxide particle may be prepared in substantially the same manner as the above-described lithium-transition metal composite oxide particle. For example, by controlling the calcination temperature, a lithium-transition metal composite oxide particle having an average particle diameter of 3 μm or less and a large diameter lithium-transition metal composite oxide particle having an average particle diameter of 10 to 15 μm may be prepared, respectively.

For example, the prepared lithium-transition metal composite oxide particle and large diameter lithium-transition metal composite oxide particle may be mixed so that a weight ratio thereof is 7:3 to 8:2, and used as a cathode active material.

FIGS. 5 and 6 are a schematic plan view and a cross-sectional view illustrating a lithium secondary battery according to exemplary embodiments, respectively. Hereinafter, a lithium secondary battery including the cathode active material including the above-described lithium-transition metal composite oxide particle will be described with reference to FIGS. 5 and 6.

Referring to FIGS. 5 and 6, the lithium secondary battery may include an electrode assembly including a cathode 100, an anode 130, and a separation membrane 140 interposed between the cathode and the anode. The electrode assembly may be housed in a case 160 together with an electrolyte to be impregnated.

The cathode 100 may include a cathode active material layer 110 formed by applying the above-described cathode active material to a cathode current collector 105.

A slurry may be prepared by mixing the cathode active material including the above-described lithium-transition metal composite oxide particles with a binder, a conductive material and/or a dispersant in a solvent, followed by stirring the same. The slurry may be coated on the cathode current collector 105, followed by compressing and drying to manufacture the cathode 100.

The cathode current collector 105 may include, for example, stainless steel, nickel, aluminum, titanium, copper, or an alloy thereof, and preferably includes aluminum or an aluminum alloy.

The binder may be selected from, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as a cathode forming binder. In this case, an amount of the binder for forming the cathode active material layer may be reduced and an amount of the cathode active material may be relatively increased, thereby improving the output and capacity of the secondary battery.

The conductive material may be included to facilitate electron transfer between the active material particles. For example, the conductive material may include a carbon-based conductive material such as graphite, carbon black, graphene, or carbon nanotubes and/or a metal-based conductive material including tin, tin oxide, titanium oxide, or a perovskite material such as $LaSrCoO_3$, and $LaSrMnO_3$.

The anode 130 may include an anode current collector 125 and an anode active material layer 120 formed by coating the anode current collector 125 with an anode active material.

The anode current collector 125 may include, for example, gold, stainless steel, nickel, aluminum, titanium, copper, or an alloy thereof, and preferably includes copper or a copper alloy.

The anode active material useable in the present invention may include any material known in the related art, so long as it can intercalate and deintercalate lithium ions, without particular limitation thereof. For example, carbon-based materials such as crystalline carbon, amorphous carbon, carbon composite, carbon fiber, etc.; a lithium alloy; a silicon compound or tin may be used. Examples of the amorphous carbon may include hard carbon, cokes, meso-carbon microbead (MCMB), mesophase pitch-based carbon fiber (MPCF) or the like.

Examples of the crystalline carbon may include graphite-based carbon such as natural graphite, artificial graphite, graphite cokes, graphite MCMB, graphite MPCF or the like. Other elements included in the lithium alloy may include, for example, aluminum, zinc, bismuth, cadmium, antimony, silicone, lead, tin, gallium, indium or the like.

The silicon compound may include, for example, a silicon-carbon composite compound such as silicon oxide or silicon carbide (SiC).

For example, a form of slurry may be prepared by mixing the anode active material with a binder, a conductive material and/or thickener in a solvent, followed by stirring the same. The slurry may be coated on at least one surface of the anode current collector 125, followed by compressing and drying to manufacture the anode 130.

As the binder and the conductive material, materials which are substantially the same as or similar to the above-described materials used in the cathode active material layer 110 may be used. In some embodiments, the binder for forming the anode may include, for example, an aqueous binder such as styrene-butadiene rubber (SBR) for consistency with the carbon-based active material, and may be used together with a thickener such as carboxymethyl cellulose (CMC).

The separation membrane 140 may be interposed between the cathode 100 and the anode 130. The separation membrane 140 may include a porous polymer film made of a polyolefin polymer such as ethylene homopolymer, propylene homopolymer, ethylene/butene copolymer, ethylene/hexene copolymer, ethylene/methacrylate copolymer. The separation membrane 140 may include a nonwoven fabric made of glass fiber having a high melting point, polyethylene terephthalate fiber or the like.

In some embodiments, the anode 130 may have an area (e.g., a contact area with the separation membrane 140) and/or volume larger than those/that of the cathode 100. Thereby, lithium ions generated from the cathode 100 may smoothly move to the anode 130 without being precipitated in the middle, for example.

The separation membrane may include a ceramic coating layer. When including the ceramic coating layer, thermal stability may be improved. Herein, the ceramic coating layer may be applied to one or more surfaces of the separation membrane.

According to exemplary embodiments, an electrode cell is defined by the cathode 100, the anode 130, and the separation membrane 140, and a plurality of electrode cells are laminated to form, for example, a jelly roll type electrode assembly 150. For example, the electrode assembly 150 may be formed by winding, lamination, folding, or the like of the separation membrane 140.

The electrode assembly 150 may be housed in the case 160 together with an electrolyte to define the lithium secondary battery. According to exemplary embodiments, a non-aqueous electrolyte may be used as the electrolyte.

The non-aqueous electrolyte includes a lithium salt of an electrolyte and an organic solvent, and the lithium salt is represented by, for example, $Li^+X^-$, and as an anion ($X^-$) of the lithium salt, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5 PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, etc. may be exemplified.

As the organic solvent, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane, and the like may be used. These compounds may be used alone or in combination of two or more thereof.

As shown in FIG. 6, electrode tabs (a cathode tab and an anode tab) may protrude from the cathode current collector 105 and the anode current collector 125, respectively, which belong to each electrode cell, and may extend to one side of the case 160. The electrode tabs may be fused together with the one side of the case 160 to form electrode leads (a cathode lead 107 and an anode lead 127) extending or exposed to an outside of the case 160.

The lithium secondary battery may be manufactured, for example, in a cylindrical shape using a can, a square shape, a pouch type or a coin shape.

According to the above-described embodiments of the present invention, the cathode active material particles in the single particle form may be prepared by using the transition metal macro precursor having an average particle diameter larger than the target average particle diameter of the lithium-transition metal composite oxide particles, and performing the pulverizing process after calcination. Thereby, the process difficulty and process costs may be reduced, and the life-span properties and driving stability of the secondary battery may be improved.

Hereinafter, specific experimental examples are proposed to facilitate understanding of the present invention. However, the following examples are only given for illustrating the present invention and those skilled in the art will obviously understand that various alterations and modifications are possible within the scope and spirit of the present invention. Such alterations and modifications are duly included in the appended claims.

Preparative Example 1: Preparation of Transition Metal Precursors Having Different Average Particle Diameters (S10)

$NiSO_4$, $CoSO_4$ and $MnSO_4$ were mixed in a molar ratio of 88:9:3 by inputting them into distilled water from which internal dissolved oxygen was removed by bubbling with $N_2$ for 24 hours to prepare a mixed solution.

The mixed solution was input into a batch reactor at 50° C., and NaOH and $NH_3H_2O$ were added thereto as a precipitant and a chelating agent to form a reaction solution.

Precursors $Ni_{0.88}Co_{0.9}Mn_{0.3}(OH)_2$ having different sizes were prepared by varying the synthesis time while maintaining the pH of the reaction solution at 11.5.

Specifically, transition metal precursors $Ni_{0.88}Co_{0.9}Mn_{0.3}(OH)_2$ having an average particle diameter of 3 μm (Precursor A), 5 μm (Precursor B), and 7 μm (Precursor C) were synthesized by varying the synthesis time to 30, 40, and 50 hours, respectively.

The prepared precursors $Ni_{0.88}Co_{0.9}Mn_{0.3}(OH)_2$ were dried at 80° C. for 12 hours, and then dried again at 110° C. for 12 hours.

Preparative Example 2: Preparation of Transition Metal Precursors Having Different BET Specific Surface Areas (S10)

Precursors were prepared according to the same procedures as described in Preparative Example 1, except that precursors $Ni_{0.88}Co_{0.9}Mn_{0.3}(OH)_2$ were synthesized by varying the pH of the reaction solution to 11.0 (Precursor D), 11.5 (Preparative Example 1, Precursor C), and 12.0 (Precursor E), respectively, for 50 hours during preparing the same.

As the pH of the reaction solution was increased during synthesis, there has been a trend toward an increase in the BET specific surface areas of the precursors.

Specifically, the BET specific surface area of Precursor D was measured to be 3.86 $m^2$/g, the BET specific surface area of Precursor C was measured to be 8.31 $m^2$/g, and the BET specific surface area of Precursor E was measured to be 10.49 $m^2$/g.

Appropriate calcination temperatures of the preliminary lithium-transition metal composite oxide particles having Ni compositions according to Preparative Examples 1 and 2 described above are 842.4 to 902.4° C. according to Equations 1 and 2.

Example 1

(1) Calcination of the Preliminary Lithium-Transition Metal Composite Oxide Particle (S20)

Precursor C synthesized in Preparative Example 1 was input so that the molar ratio of $LiOH \cdot H_2O$ was 1:1.07. Then, a mixture was obtained by uniformly stirring and mixing them for 5 minutes. The mixture was put into a calcination furnace, heated to 870° C. at a rate of 2° C./min, and calcined by maintaining at 870° C. for 10 hours. Oxygen gas was continuously passed at a flow rate of 10 mL/min during heating and maintaining the temperature.

After the end of the calcination, the calcined product was naturally cooled to room temperature to obtain the preliminary lithium-transition metal composite oxide ($LiNi_{0.98}Co_{0.02}O_2$) particle.

(2) Pulverizing Process (S30)

The calcined lithium-transition metal composite oxide particle was ground/pulverized using jet mill equipment to separate secondary particles into the form of primary particles.

The samples were transferred by setting the pressure to be 5.5 bar, and each transferred sample was ejected in the center direction of a cylindrical device through three nozzles arranged at an interval of 120 degrees at the same height of the cylindrical device. The preliminary lithium-transition metal composite oxide ejected at a high speed was ground into fine particles having a size of 3 μm or less by collision between the particles in the center of the reactor, followed by obtaining the lithium-transition metal composite oxide particle crushed through a classifier equipped at an upper portion of the device.

(3) Formation of Metal Oxide Coating Layer (S40)

$Al_2O_3$ (average particle diameter: 30 to 70 nm), $TiO_2$ (average particle diameter: 30 to 70 nm) and $ZrO_2$ (average particle diameter: about 100 nm) were input to the obtained lithium-transition metal composite oxide particle in a dry high-speed mixer and uniformly mixed for 5 minutes to prepare a mixture.

At this time, the $Al_2O_3$, $TiO_2$ and $ZrO_2$ were input in an amount of 1,500 ppm, 1,200 ppm, and 500 ppm, respectively, based on a total weight of the lithium-transition metal composite oxide particle.

The mixture was put into a calcination furnace, heated to 700° C. at a rate of 2° C./min, and maintained at 700° C. for 10 hours. Oxygen gas was continuously passed at a flow rate of 10 mL/min during heating and maintaining the temperature.

After the end of the calcination, the calcined product was naturally cooled to room temperature, followed by pulverizing and classification to obtain lithium-transition metal composite oxide particle having a coating layer (Al, Ti and Zr) formed on the surface of the particle. Through the above-described coating and heat treatment, it is possible to remove cracks on the surface of the particles generated by collision between the particles during the pulverizing process with a jet mill (4) Washing with Water and Drying Processes, and Formation of Boron-Containing Coating Layer The lithium-transition metal composite oxide particle having the Al coating layer formed thereon were mixed with water in a volume ratio of 1:1, stirred for 10 minutes, then filtered and washed with water. The filtered lithium-transition metal composite oxide particle was dried at 130° C. for 12 hours.

The washed with water and dried lithium-transition metal composite oxide particle and 400 ppm of $H_3BO_3$ based on the total weight of the particles were input into the dry high-speed mixer, and the mixture was uniformly mixed for 5 minutes to prepare a mixture.

Specifically, the dried lithium-transition metal composite oxide particle and 400 ppm of $H_3BO_3$ based on the total weight of the particles were put into a calcination furnace in an oxygen atmosphere, and heated at a rate of 2° C./min while mixing in a dry manner. The mixture was heated to 300° C., and maintained for 10 hours to prepare the lithium-transition metal composite oxide particle on which a coating layer containing boron was further formed.

(5) Manufacture of Lithium Secondary Battery

A secondary battery was manufactured using the lithium-transition metal composite oxide particle prepared above as a cathode active material. Specifically, the cathode active materials, Denka Black as a conductive material and PVDF as a binder were mixed in a mass ratio composition of 93:5:2, respectively, to prepare a cathode slurry. Then, the slurry was applied to an aluminum current collector, followed by drying and pressing the same to prepare a cathode. After the pressing, an electrode density of the cathode was controlled in a range of 3.6 to 3.7 g/cc.

Lithium metal was used as an anode.

The cathode and anode prepared as described above were notched in a circular shape having a diameter of Φ14 and Φ16, respectively, and laminated, then an electrode cell was prepared by disposing a separator (polyethylene, thickness: 13 μm) notched to Φ19 between the cathode and the anode. The prepared electrode cell was put into a coin cell case having a specification of diameter of 20 t and a height of 1.6 t, then an electrolyte was injected and assembled, followed by aging for 12 hours or more so that the electrolyte could be impregnated inside the electrodes.

The electrolyte used herein was prepared by dissolving 1M $LiPF_6$ solution in a mixed solvent of EC/EMC (30/70; volume ratio).

The secondary battery manufactured as described above was subjected to formation charging-discharging (charge condition: CC-CV 0.1 C 4.3 V 0.005 C CUT-OFF, discharge condition: CC 0.1 C 3 V CUT-OFF).

Example 2

A cathode active material and a lithium secondary battery were manufactured according to the same procedures as described in Example 1, except that Precursor D was used during calcination of the preliminary lithium-transition metal composite oxide particles.

Example 3

A cathode active material and a lithium secondary battery were manufactured according to the same procedures as described in Example 1, except that Precursor E was used during calcination of the preliminary lithium-transition metal composite oxide particles.

Comparative Example 1

A cathode active material and a lithium secondary battery were manufactured according to the same procedures as described in Example 1, except that Precursor A was used and the pulverizing process was not performed during calcination of the preliminary lithium-transition metal composite oxide particles.

Comparative Example 2

A cathode active material and a lithium secondary battery were manufactured according to the same procedures as described in Example 1, except that Precursor B was used, the calcination temperature was set to 890° C. during calcination of the preliminary lithium-transition metal composite oxide particles, and the pulverizing process was not performed.

Types and physical properties of the transition metal precursors used in the above-described examples and comparative examples are shown in Table 1 below.

TABLE 1

| Section | Type of transition metal precursor | Average particle diameter of transition metal precursor (μm) | BET specific surface area (m²/g) | Calcination temperature (° C.) |
|---|---|---|---|---|
| Example 1 | Precursor C | 7 | 8.31 | 870 |
| Example 2 | Precursor D | 7 | 3.86 | 870 |
| Example 3 | Precursor E | 7 | 10.49 | 870 |
| Comparative Example 1 | Precursor A | 3 | — | 870 |
| Comparative Example 2 | Precursor B | 5 | — | 890 |

Experimental Example (1) Evaluation of Initial Capacity

The lithium secondary batteries according to the examples and comparative examples were charged (0.1 C-rate CC/CV, 4.3 V 0.05 C Cut-Off) and discharged (0.1 C-rate CC, 3.0 V Cut-Off) once at 25° C., and initial charge capacities and initial discharge capacities were measured.

(2) Evaluation of Capacity Retention Rate at Room Temperature

The lithium secondary batteries according to the examples and comparative examples were repeatedly charged (0.5 C-rate CC/CV, 4.3 V 0.05 C Cut-Off) and discharged (0.1 C-rate CC, 3.0 V Cut-Off) 100 times at 25° C., and discharge capacities at 1st time and discharge capacities at 100th time were measured.

A room temperature capacity retention rate was calculated as a percentage by dividing the discharge capacity measured at 100th time by the discharge capacity measured at 1st time.

Capacity retention rate (%)=(Discharge capacity at
100th time/Discharge capacity at 1st time)×100

Evaluation results are shown in Table 2 below.

TABLE 2

| Section | Charge capacity (mAh/g) | Discharge capacity (mAh/g) | Capacity efficiency (%) | Discharge capacity at 1st cycle (mAh/g) | Discharge capacity at 100th cycle (mAh/g) | Capacity retention rate (%) |
|---|---|---|---|---|---|---|
| Example 1 | 238.5 | 212.3 | 89.0 | 183.4 | 158.3 | 86.3 |
| Example 2 | 238.1 | 211.8 | 89.0 | 183.2 | 156.5 | 85.4 |
| Example 3 | 237.8 | 212.5 | 89.4 | 184.3 | 157.1 | 85.2 |
| Comparative Example 1 | 237.1 | 207.3 | 87.5 | 177.3 | 149.3 | 84.2 |
| Comparative Example 2 | 237.0 | 204.6 | 86.3 | 176.3 | 146.1 | 82.9 |

FIGS. 7(a)-(f) are surface SEM photographs of the cathode active materials prepared according to the examples. Specifically, FIGS. 7(a)-(f) are surface images of Precursor C, Precursor D and Precursor E respectively used in Examples 1 to 3 (FIGS. 7(a), (b) and (c), respectively), and surface images of lithium-transition metal composite oxide particles respectively obtained using precursor C, Precursor D and Precursor E in Examples 1 to 3 (FIGS. 7(d), (e) and (f), respectively).

For example, in the case of a cathode active material formed of secondary particles by gathering primary particles, the cathode active material having a high BET specific surface area of the precursor may exhibit a high discharge capacity. In addition, in the case where the surface shape of the transition metal precursor is a needle shape (e.g., FIG. 7(a) and FIG. 7(c)), the cathode active material may exhibit a high discharge capacity than the case of a flake shape (e.g., FIG. 7(b)).

However, according to the embodiments of the present invention, since a process of preparing primary particles having a size of 1 to 3 μm, which is a typical single particle size, then pulverizing secondary particles in which the primary particles are aggregated is performed, there was no substantial change in the discharge capacity depending on the BET specific surface area of the transition metal precursors according to Examples 1 to 3.

FIGS. 8(a)-(d) are surface SEM photographs of the cathode active materials prepared according to the comparative examples. Specifically, FIGS. 8(a)-(d) are surface images of Precursor A and Precursor B respectively used in Comparative Examples 1 and 2 (FIGS. 8(a) and (b), respectively), and surface images of lithium-transition metal composite oxide particles respectively obtained using Precursor A and Precursor B in Comparative Examples 1 and 2 (FIGS. 8(c) and (d), respectively).

In the case of Comparative Example 1 in which the transition metal precursor has an average particle diameter of 3 μm, calcination at 870° C. was required to form single particles (see FIG. 8(c)), but in the case of Comparative Example 2 in which the transition metal precursor has an average particle diameter of 5 μm, single particles were formed only when calcined at 890° C. (see FIG. 8(d)).

However, in Examples 1 to 3, although the transition metal macro precursor has an average particle diameter of 7 μm, single particles were sufficiently formed at 870° C. (see FIGS. 7(d), (e) and (f)).

Referring to FIGS. 4(a) and 8(c), in the case of Comparative Example 1 in which the transition metal precursor has an average particle diameter of 3 μm, a separate pulverizing process was not performed, and thus single particles were not sufficiently separated. In this case, since lithium ions were not smoothly diffused through the electrolyte due to adhesion of the single particles, the discharge capacity was reduced compared to the examples.

In addition, in the case of Comparative Example 2 in which the transition metal precursor has an average particle diameter of 5 μm, a separate pulverizing process was not performed, and thus, single particles were not completely separated similar to Comparative Example 1. Further, since the particles also have a large average particle size, a diffusion path of lithium ions in the particles was increased, such that the discharge capacity was decreased.

FIG. 9 is a graph illustrating evaluation results of capacity retention rates of secondary batteries according to the examples and comparative examples.

Referring to FIG. 9, the secondary batteries of the comparative examples had lower initial discharge capacity, discharge capacities at 1st time of charging and discharging and 100th time of charging and discharging, and capacity retention rate than those of Examples 1 to 3, respectively, such that the output properties and life-span properties were reduced.

DESCRIPTION OF REFERENCE NUMERALS

100: Cathode
105: Cathode current collector
110: Cathode active material layer
120: Anode active material layer
125: Anode current collector
130: Anode
140: Separation membrane
160: Case

What is claimed is:
1. A method of manufacturing a cathode active material for a secondary battery, the method comprising:

mixing a transition metal macro precursor and a lithium precursor to prepare a preliminary lithium-transition metal composite oxide particle;

calcining the preliminary lithium-transition metal composite oxide particle; and;

pulverizing the calcined preliminary lithium-transition metal composite oxide particle through a jet mill to form a lithium-transition metal composite oxide particle having an average particle diameter (D50) smaller than an average particle diameter of the transition metal macro precursor, wherein the transition metal macro precursor has a BET specific surface area of 8.31 to 11 $m^2/s$, wherein the lithium-transition metal composite oxide is represented by Formula 1 below:

$$Li_aNi_xM_{1-x}O_{2+y} \qquad \text{[Formula 1]}$$

wherein in Formula 1, a is in a range of $0.9 \le a \le 1.2$, x is 0.6 or more ($x \ge 0.6$), and y is in a range of $-0.1 \le y \le 0.1$, and M denotes at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn, Ba, Sr or Zr.

2. The method according to claim 1, wherein the average particle diameter of the transition metal macro precursor is 7 μm or more.

3. The method according to claim 1, wherein the calcined preliminary transition metal composite oxide particle comprises a form of secondary particle which is an aggregate of primary particles.

4. The method according to claim 3, wherein the pulverizing is a step of separating the secondary particle into the primary particles.

5. The method according to claim 1, wherein the lithium-transition metal composite oxide particle comprises a form of single particle.

6. The method according to claim 5, wherein the form of single particle comprises a form of single body formed by attaching or coming into close contact with each other of 2 to 10 single particles.

7. The method according to claim 1, wherein the lithium-transition metal composite oxide particle has an average particle diameter of 1 to 3 μm.

8. The method according to claim 1, wherein a calcination temperature at the step of calcining the preliminary lithium-transition metal composite oxide particle is represented by Equations 1 and 2 below:

$$T2-30 \le T1(^\circ C.) \le T2+30 \qquad \text{[Equation 1]}$$

wherein in Equation 1, T2 is a temperature according to Equation 2 below, and T1 is the calcination temperature $$T2(^\circ C.)=-520*x+1330 \qquad \text{[Equation 2]}$$

wherein in Equation 2, x is the x defined in Formula 1 above.

9. The method according to claim 1, wherein the pulverizing comprises the step of accelerating and pulverizing the calcined lithium-transition metal composite oxide particle using compressed air.

10. The method according to claim 1, wherein the step of forming of the lithium-transition metal composite oxide particle further comprises the step of pulverizing the calcined preliminary lithium-transition metal composite oxide particle, then coating a surface with a metal salt and performing heat treatment.

11. The method according to claim 1, wherein the transition metal macro precursor comprises a compound containing nickel, cobalt and manganese.

12. The method according to claim 1, wherein the lithium precursor comprises at least one of lithium carbonate, lithium nitrate, lithium acetate, lithium oxide and lithium hydroxide.

13. The method according to claim 1, wherein the calcined preliminary lithium-transition metal composite oxide particle forms an aggregate of the preliminary lithium-transition metal composite oxide particle, and excluding a step of crushing the aggregate of the preliminary lithium-transition metal composite oxide particle.

* * * * *